United States Patent

[11] 3,624,752

| | | |
|---|---|---|
| [72] | Inventor | Helmut Schmidt<br>Essen-Haarzopf, Germany |
| [21] | Appl. No. | 884,557 |
| [22] | Filed | Dec. 12, 1969 |
| [45] | Patented | Nov. 30, 1971 |
| [73] | Assignee | Bergwerksverband GmbH<br>Essen, Germany |
| [32] | Priority | Dec. 21, 1968 |
| [33] | | Germany |
| [31] | | P 18 16 443.7 |

[54] STORAGE UNITS FOR PNEUMATIC LOGIC SYSTEMS
14 Claims, 13 Drawing Figs.

[52] U.S. Cl. .................................................. 137/625.49,
137/81.5, 137/608
[51] Int. Cl. .................................................. F15c 3/00,
F16k 11/00
[50] Field of Search .................................. 235/201
ME; 251/65; 137/625.18, 112, 625.49, 81.5, 608

[56] References Cited
UNITED STATES PATENTS

| 2,811,979 | 11/1957 | Presnell | 137/112 |
|---|---|---|---|
| 2,875,780 | 3/1959 | Martin | 251/30 X |
| 3,070,295 | 12/1962 | Glattli | 137/112 X |
| 3,109,442 | 11/1963 | Horowitz | 137/625.18 X |
| 3,151,623 | 10/1964 | Riordan | 137/112 |
| 3,203,439 | 8/1965 | Beckett | 251/65 X |
| 3,335,950 | 8/1967 | Tal et al. | 137/112 UX |
| 3,465,777 | 9/1969 | Thorburn | 235/201 X |
| 3,466,002 | 9/1969 | Freeman | 235/201 X |
| 3,468,338 | 9/1969 | Patterson | 251/65 X |
| 3,495,620 | 2/1970 | Raimondi et al. | 251/65 X |

FOREIGN PATENTS

| 208,703 | 7/1924 | Great Britain | 251/129 |
|---|---|---|---|
| 914,086 | 5/1954 | Germany | 251/65 |

*Primary Examiner*—Samuel Scott
*Attorney*—Malcolm W. Fraser

ABSTRACT: A storage unit for pneumatic logic systems, especially systems for control and adjustment purposes in underground mining, comprising a body of nonmagnetic material having a passage to receive a piston made of magnetizable material which can assume in the passage two terminal positions defined by permanent magnets, and which can be shifted from one terminal position to the other under the influence of the signals for setting and resetting; the piston being formed as a blocking spool to control the inlet and outlets relating to the operative input and output signals, which have port in the passage.

PATENTED NOV 30 1971 3,624,752

INVENTOR
Helmut Schmidt
by Malcolm W. Prosser
attorney

STORAGE UNITS FOR PNEUMATIC LOGIC SYSTEMS

BACKGROUND OF THE INVENTION

Storage units for pneumatic logic systems are known, especially systems for control and adjustment purposes in underground mining, the unit having inputs to set and reset the storage unit, as well as inlets and outlets for the operative input and output compressed air signals.

Pneumatic logic systems are employed in place of electronic logic systems in underground control techniques because of their safety as regards firedamp. As a consequence of the difficult conditions of operation underground, failure of the compressed air which is required to actuate the logic elements, due to disruption of the supply of compressed air, has often occurred.

Pneumatic storage units of the already-known type for these logic systems have the drawback that, upon interruption of the supply of compressed air, bits of information in the storage units become lost. If, following restoration of the supply of compressed air, the mechanism is again switched on, the system starts up from an undefined and therefore invariably false initial condition and the control function governed by the system becomes inaccurate. To prevent incorrect control movements, after switching the compressed air on again, the correct condition for the system therefore has to be supplied manually or by means of remote control, that is, the storage units have to be restored to the condition they were in before the interruption to the supply of compressed air. This adjusting procedure for the storage units costs time and entails an appreciable outlay.

OBJECT OF THE INVENTION

At the basis of the invention is the problem of creating an information store that is suitable for pneumatic logic systems and that does not lose the bits of information stored in it when the supply of compressed air fails.

BRIEF SUMMARY OF THE INVENTION

According to the invention, this problem is solved by providing a storage unit comprising a body consisting of a nonmagnetic material, with a passage to receive a piston which is of a magnetizable material and can assume in the passage two terminal positions defined by permanent magnets, and which can be shifted from one terminal position to the other one under the influence of the signals for setting and for resetting, the piston being formed as a blocking spool in respect of the inlets and outlets for the operative input and output signals which have port in the passage.

The magnets fix the position of the control piston, and consequently also the information contained in the storage unit, even if the compressed air for shifting the piston has failed. If the supply of compressed air is once more restored, then the piston will be in the position that it had assumed before the failure of the compressed air. The system therefore always starts up from the correct initial position, and a subsequent signal for setting or for resetting is able to shift the piston to the other position. Such a long persistence or remanent storage unit possesses the advantage that, after the failure of the compressed air, the unit doe not require to be first reset. It can be switched to a new setting both actively and passively; in the event of a passive switching operation, the inlet for the compressed air only requires to be closed, and according to the position of the piston the signal for setting or resetting will appear directly at an outlet of the storage unit. On the other hand, in the case of active switching, it is the inlet for compressed air that is supplied with auxiliary air. An interrogating pulse at the inlet for auxiliary air appears directly at one of the outlets from the storage unit, and by this means indicates the last position of the piston as preserved by the magnetic long persistence effect. With the employment of interrogating pulses, the storage unit operates with a minimum expenditure of air.

FURTHER FEATURES OF THE INVENTION

In practice, the pneumatic storage unit according to the invention is carried into effect thus, first that the prismatic body, consisting of a nonmagnetic material, carries the two permanent magnets, respectively on two oppositely situated faces and at which terminates the passage for the control piston, each of said magnets having a bore which has port in the passage guiding the piston, one bore forming the input for the setting signal, and the other bore forming the input for the resetting signal, and second that, between the two faces of the nonmagnetic body which carry the magnets, the said body has on a further face the inlet for the compressed air and on a face opposite to the last-mentioned one it has one or more compressed air outlets.

BRIEF SUMMARY OF DRAWINGS

This and further features of the invention are explained hereinafter in greater detail having regard to the accompanying drawings.

DESCRIPTION OF EMBODIMENTS

Figure 1:
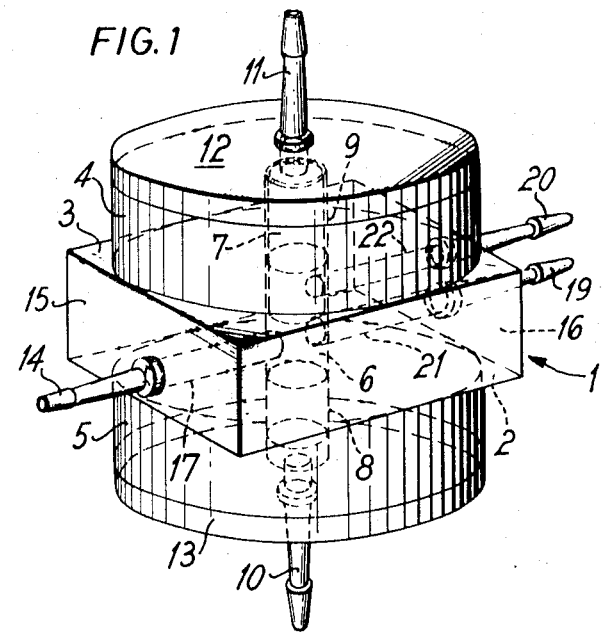
FIG. 1 shows, in a perspective view, a pneumatic storage unit according to the invention.

The device shown in FIG. 1 is a pneumatic storage unit for logic systems which find application in the control and/or adjustment systems of machines and installations, especially in underground mining.

The storage unit has a body 1 made of a nonmagnetic material, in the form of a prism. On two oppositely situated faces 2, 3, are secured permanent magnets 4 and 5, for example by adhesive means. Normally disposed relative to the faces 2 and 3 is situated the longitudinal axis of a generally cylindrical passage 6 which gives guidance to a control piston 7 consisting of a magnetizable material. The piston is able to assume two terminal positions, either of which is determined by the effect of one or other of the two permanent magnets 4 or 5, respectively.

The ferrite cores constituting the permanent magnets 4 and 5, respectively, have bores 8 and 9 aligned with the outer ends of the cylindrical passage. Into the bores are inserted nozzles 10 and 11 respectively, to which can be connected hose pipes or ducting units (not shown). The ends of the nozzles turned towards the bores 8 and 9 are located in bodies 12 and 13, respectively, of a plastics material, which are secured on the outer faces of the magnets 4 and 5 that are averted from the faces 2 and 3 of the nonmagnetic body 1.

The prismatic body has six faces, of which two, of greater area, constitute the faces 2 and 3. On two further oppositely situated faces 15 and 16 respectively, which are located between the planes of the faces 2 and 3 of the body carrying the two magnets 4 and 5, there emerge further nozzles for connection to hose piping or ducting for carrying compressed air signals. The face 15 carries an inlet nozzle 14 for a connection to the compressed air control input and the nozzle has port in a bore 17 which for its part terminates in the passage 6 for the control piston 7 of magnetizable material.

The face 16 carries two nozzle 19 and 20 which are inserted into the ends of bores 21 and 22, which from the other side have port in the passage 6. The nozzles 19 and 20 constitute the compressed air outlets from the storage unit.

The input for setting the storage unit is located on the face 2 and is formed by the bore 8 which is denoted by S in the symbolic or schematic representations in FIGS. 2 to 13. The resetting input R is located on the face 3, and is formed by the bore 9.

The bore emerging on the face 15 is denoted by E in the accompanying schematic representations, while the bores for the nozzles 19 and 20 on the face 16 are identified by the designations A and A' respectively.

By means of a pneumatic signal, which appears at the setting input S or the resetting input R, the piston can be released from the magnet either 4 or 5, whichever is concerned, and can be shifted to the other one of its extreme positions within the passage 6. If auxiliary air is fed to the input S, then a signal will appear at outlet A if the piston is in the upper position shown in FIG. 2. If, however, the piston should have attained the lower position, then A will carry no signal.

Figure 2:
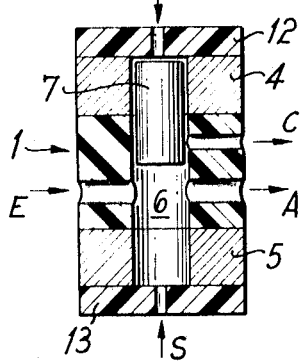
FIG. 2 shows in diagrammatic form, that is, with the omission of all details not essential for an understanding of the invention, the storage unit according to FIG. 1 but now in section.

In the form of embodiment according to FIG. 2, a venting capillary C is provided which consists of a corresponding bore that runs parallel to the bore for A. The storage unit shown in FIG. 2 therefore emits an output signal in only one switching condition.

Figure 3:
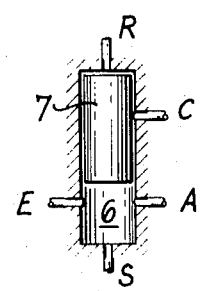
FIG. 3 shows the storage unit according to FIG. 1 in a symbolic presentation, with the omission of the two permanent magnets.
Figure 4:
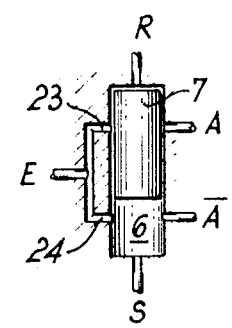
FIG. 4 shows a storage unit according to the invention and reproducing, besides the valid condition, also the nonvalid condition.

On the other hand, the storage unit according to FIG. 4, in which, as in the storage unit according to FIG. 3 the magnets 4 and 5 have been omitted for clarity, also reproduces the nonvalid condition of the storage unit. This takes place by means of a further outlet $\overline{A}$. The outlets A and $\overline{A}$ are situated at the outer ends of parallel bores into which are inserted the nozzles 19 and 20 in the example of an embodiment according to FIG. 1.

In the embodiments of the storage units described so far, in at least one position of the piston 7 the auxiliary air inlet E is short-circuited with one of the inputs S or R. If this is not desired, then the storage unit will be formed according to FIG. 5.

Figure 5:
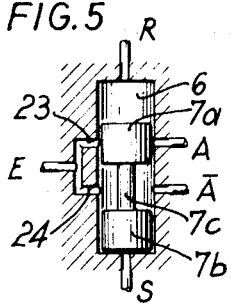
FIG. 5 shows a modified form of embodiment of the storage unit depicted in FIG. 4.

In the passage 6 of the storage unit shown in FIG. 5 moves a dumbbell-shaped piston which accordingly consists of two portions 7a and 7b of equal diameter (a comparatively large one) and of a portion 7c of a comparatively small diameter. The inlet E for compressed air branches, and has two parallel bores 23 and 24, so that the piston separates either the input S or the input R from the inlet E and, respectively, the outlets A, $\overline{A}$.

Figure 6:
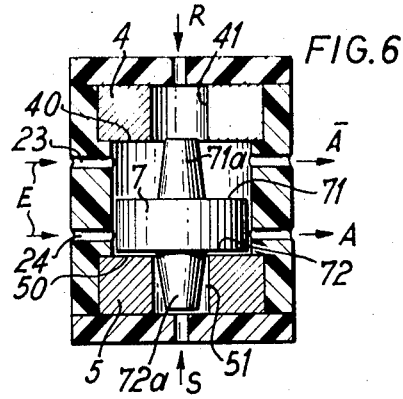
FIG. 6 shows, in a presentation corresponding to FIG. 2, a further form of embodiment of the storage unit according to the invention with an increased long persistence effect.

In the example of an embodiment according to FIG. 6, the storage unit in turn possesses two inlets 23 and 24 for the auxiliary compressed air, but also has a specially formed piston 7. The piston on its two outer faces 71 and 72 respectively has two stud-shaped projections 71a and 72a respectively, and the sides of the two magnets 4 and 5 which are turned towards the control piston 7, and which are designated 40 and 50 respectively, have excisions 41 and 51 respectively for the projections 71 and 72 of the piston 7. In addition, the said magnets 4 and 5 are, in order to receive the piston 7, sunk into correspondingly enlarged zones of the passage 6. By this means a relatively great remanent effect is obtained in respect of the piston 7.

Figure 7:
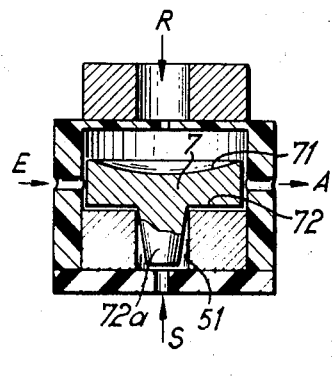
FIG. 7 shows a storage unit according to the invention with a resetting signal given preference.

FIG. 7 shows a piston 7, one side 72 of which is in turn provided with a projection 72a, the side 71 of which, however, has no projection and therefore possesses a larger effective surface area than does the opposite side 72. The larger effective area on side 71 of the piston 7 faces the input R. By this means, priority for the resetting signal is provided. If the piston 7 is so formed that the larger effective area arises on the side 72, then the setting signal will constitute the priority one.

Figure 8:
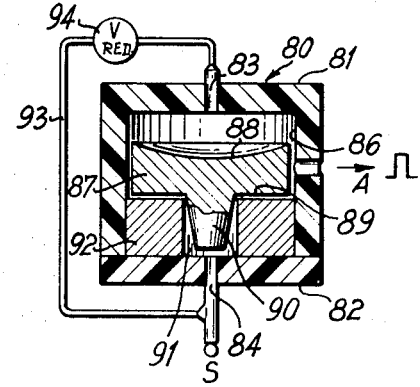
FIG. 8 shows a pulse shaper according to a further feature of the invention, in accordance with a first embodiment.
Figure 9:
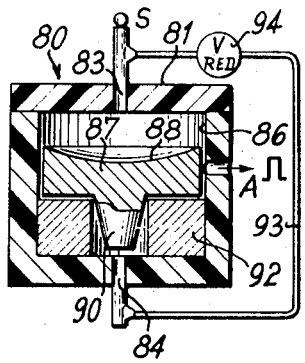
FIG. 9 shows the pulse shaper according to FIG. 8 but in a modified embodiment.

FIGS. 8 and 9 show a pulse shaper. The pulse shaper has a body 80, varying from the prismatic towards the cylindrical, consisting of nonmagnetic material. At its front and rear ends, 81 and 82 respectively, the body possesses bores 83 and 84 respectively, which lead into a chamber 86 in which a piston 87 is able to move. The piston 87 has an end face 88 and an end face 89, the end face 88 having a larger effective area than the face 89, which is provided with a projection 90 that is able to protrude into a recess 91 belonging to a permanent magnet 92.

The input for a setting signal is designated by S. In a line 93 leading from S to the bore 83 is installed a time delay device 94.

In FIG. 9 the reference numerals similar to the reference numerals in FIG. 8 designate parts that correspond with each other.

Whereas in FIG. 8 the pulse shaper shown always emits a pulse at A when the signal condition at S alters from O to L, the pulse shaper according to FIG. 9 always emits a pulse when the signal condition at S alters from L to O.

Figure 10:
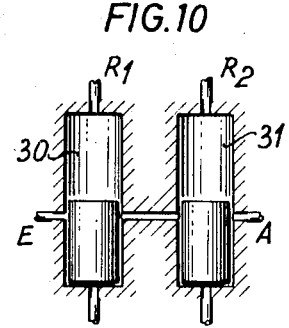
FIG. 10 shows the AND combination of two or more long persistence storage units according to a further aspect of the invention.

FIG. 10 shows an AND combination of two setting or input signals. This takes place with the assistance of two storage units 30 and 31, the storage unit 31 functioning as an auxiliary storage unit. The inlet for compressed air in respect of the auxiliary storage unit is connected up with the outlet for compressed air from the storage unit 30; one of the setting signals $S_1$ appears at the input concerned of the storage unit 30 when the other of the setting signals, $S_2$, is present at the input concerned of the other storage unit 31. In this way, at A an interrogating signal is only obtained when both pistons are located in what, in FIG. 10, is the upper position.

Figure 11:
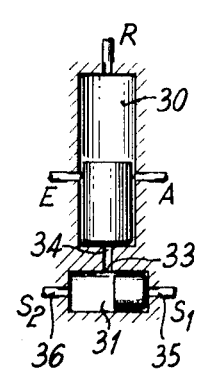
FIG. 11 shows the OR combination of two setting signals with the assistance of storage units according to the invention.

On the other hand, FIG. 11 shows the OR combination of two input or setting signals $S_1$ and $S_2$. For this purpose, the auxiliary storage unit 31 along with its outlet 33 is connected to the setting input 34 of the storage unit 30. The setting and resetting signal inputs 35 and 36 respectively, appertaining to the auxiliary storage unit, carry the signals $S_1$ and $S_2$ which are connected with each other. If so desired, the two OR inputs $S_1$ and $S_2$ can be uncoupled by means of a nonreturn valve.

Figure 12:
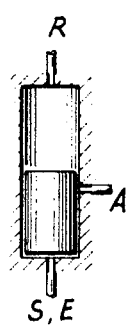
FIG. 12 shows a passively switched storage unit according to the invention.

One of the two types of operation of a storage unit formed approximately as in FIG. 1 is shown in FIG. 12. Here a so-called passive switching operation is being dealt with. This is characterized by the fact that the inlet E is closed, something that in FIG. 12 is indicated by omitting the inlet concerned. By this means, the control signal S, which is simultaneously the setting signal for the storage unit, appears directly at the outlet A. Any interrogating signal that may be present can likewise be linked to the input S. With the active switching operation, on the other hand, the inlet E is present. The auxiliary air is routed there. This air can be present either permanently or in the form of interrogating pulses. The latter possibility is the more interesting, since it operates with a minimal consumption of air.

In combination with the drawings, the explanation that has been furnished shows that, with the storage unit according to the invention, or with the pulse shaper formed according to this principle (FIG. 8 and 9), entire matrices can be constructed in which information can be stored cheaply and safely within the scope of communications systems in general. This information is not lost in the event of a temporary or long-term failure in the supply of compressed air.

Figure 13:
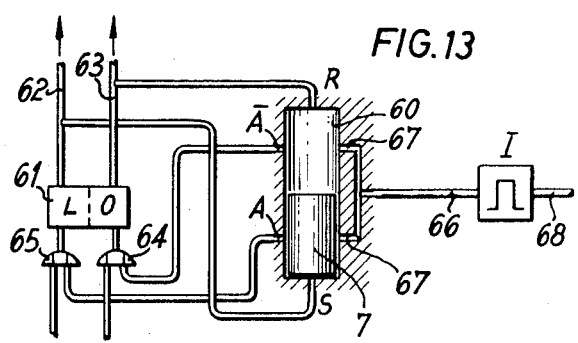
FIG. 13 shows a logic circuit in which a storage unit according to the invention is combined with an information store which relies on a supply of compressed air.

In FIG. 13 is shown a possibility of providing a common circuitry for the storage unit according to the invention and therein designated 60, and also for an information storage unit 61 of conventional type having the property that it loses its bits of information when the supply of compressed air is interrupted. This storage unit 61 possesses two inputs $\bar{S}$, $\bar{R}$ and two outlets 62, 63. The outlets 62 and 63 are linked to the inputs S, R of the "long persistence storage unit" 60 according to the invention. The outputs of the long persistence storage unit, A and $\bar{A}$, are connected, by way of two OR functions 64 and 65 respectively, to the inputs $\bar{S}$ and $\bar{R}$ of the information storage unit 61. The inlet to the long persistence storage unit 60, designated by 66 and along with two parallel branches 67 led into the storage unit 60, proceeds from a pulse shaper I which for its part is linked up at 68 with the compressed air.

If the auxiliary air supply fails and if it is then switched on again, the pulse produced by I will proceed, according to the position of the piston 7 in the long persistence storage unit 60, by way of the outlets A or $\bar{A}$ and will switch the storage unit 61 once more into the correct condition for operation, that is, the condition which the unit had assumed before the failure of the compressed air.

I claim:
1. A storage unit for pneumatic logic systems, comprising:
  A. a body of nonmagnetic material having an internal passageway with two ends,
  B. terminal permanent magnet means situated adjacent to at least one of said two ends of said internal passageway and having an additional passageway through said terminal magnet means, said additional passageway being aligned with said internal passageway.
  C. a piston of magnetizable material situated within and adapted to move through said internal passageway, said piston having two ends, at least one end of said piston being situated within said additional passageway when said piston has traveled in the direction of said one end,
  D. setting and resetting nozzles for applying setting and resetting pneumatic input signals to said piston in a direction coaxial with said internal passageway,
  E. outlet and inlet nozzles respectively for pneumatic output signals and for additional pneumatic input signals, said outlet and inlet nozzles connecting the inside of said internal passageway to points of input-signal source and output-signal load, the points of connection between said outlet and inlet nozzles and said internal passageway being physically so arranged that said piston selectively blocks the points of connection, thereby controlling output signals according to the position of the piston.

2. A pneumatic storage unit according to claim 1 connected to an additional similar storage unit to form an AND unit receiving as its two inputs the setting signals to the two storage units, the inlet nozzle of the additional unit being attached to the outlet nozzle of said pneumatic storage unit, one of said setting signals appearing at the setting nozzle of said pneumatic storage unit and the other setting signal appearing at the corresponding setting nozzle of said additional storage unit.

3. A pneumatic storage unit according to claim 1 connected to an additional similar storage unit to form an OR unit receiving as its inputs two setting signals, the outlet nozzle of said additional storage unit being connected to one of said setting and resetting nozzles of said pneumatic storage unit, the setting and resetting nozzles of said additional storage unit each carrying a respective one of the two setting signals linked by the OR combination.

4. A pneumatic storage unit according to claim 1 further comprising an information storage unit of the type which loses its stored information if an energizing supply of compressed air fails, said information storage unit adapted to contain a bit of information, means connecting said information storage unit in parallel with said pneumatic storage unit, two outlets of said pneumatic storage unit being connected with setting and resetting inputs of the information storage unit in an OR function the setting and resetting inputs of said pneumatic storage unit being connected to outlets of said information storage unit.

5. A storage unit according to claim 1 wherein said terminal magnet means comprises a pair of permanent magnets respectively situated adjacent to opposite ends of the internal passageway, each of said pair of magnets having a passageway therethrough which is aligned with said internal passageway.

6. A storage unit according to claim 5 wherein one of the two ends of said piston is situated within the passageway in one of said pair of magnets when said piston has traveled in the direction of said one of said pair of magnets and wherein the other of the two ends of said piston is situated within the passageway in the other of said pair of magnets when said piston has traveled in the direction of the other of said pair of magnets.

7. A storage unit according to claim 6 wherein the passageway through a first of said pair of magnets forms a port for the setting pneumatic input signal to be applied to one end of said piston, and wherein the passageway through the other of said pair of magnets forms a port for the resetting pneumatic input signal to be applied to the other end of said piston.

8. A pneumatic storage unit according to claim 7, further comprising a venting capillary running through said body to said internal passageway, whereby the storage unit provides an output signal in one and only one of the set of two conditions which consists in the SET condition and the RESET condition.

9. A pneumatic storage unit according to claim 7, wherein said input signal source is a source of compressed air and wherein said inlet nozzles for said compressed air comprises two parallel bores.

10. A pneumatic storage unit according to claim 9, wherein said piston comprises two short piston sections interconnected by a rod of smaller cross section in a generally dumbbell shape, the spacing of said piston sections being such that one piston section closes off one of said two parallel bores when said piston has traveled in said direction of said one of said pair of magnets, and that the other piston section closes off the other of said two parallel bores when said piston has traveled in said direction of said other of said pair of magnets 11. A pneumatic storage unit according to claim 1, wherein each of said two ends of said piston has a face of different size from the face of the other end, whereby a first pneumatic signal applied to the larger of the two faces has a greater effect than a similar second pneumatic signal applied to the smaller of the two faces, one of the first and second pneumatic signals being the setting signal and the other of the first and second pneumatic signals being the resetting signal, whereby whichever one of said setting signal and said resetting signal is applied to the larger face is given preference.

12. A pneumatic storage unit according to claim 11 wherein said smaller face fits closely into said additional passageway when the piston has traveled to the end of the internal passageway in the direction of said smaller face, whereby the effective area of the piston on the smaller face end of said piston, on which area any applied pressure generates force, is reduced to that portion of the smaller face end within said additional passageway which forms said smaller face.

13. A pulse shaper for logic systems, comprising:
  A. a housing of nonmagnetic material having a chamber;
  B. a piston of magnetizable material, with one larger more effective face and one oppositely situated smaller less effective face, displaceable in the chamber;
  C. a permanent magnet turned towards the said face of lesser effectiveness, which magnet contains a passageway into which closely fits the smaller face of the piston;
  D. a setting signal input connected to said passageway in said magnet;
  E. a pneumatic line branching from said input;
  F. a time delay device in said branching pneumatic line; and
  G. an additional input fed from said branching line and leading to the larger more effective face of the piston 14. A pulse shaper for logic systems, comprising:
  A. a housing of nonmagnetic material having a chamber;

B. a piston of magnetizable material, with one larger more effective face and one oppositely situated smaller, less effective face, displaceable in the chamber;
C. a permanent magnet turned towards the said face of lesser effectiveness, which magnet contains a passageway into which closely fits the smaller face of the piston;
D. an input which leads to the larger, more effective face of the piston;
E. a setting signal connected said input;
F. a pneumatic branching line for carrying part of the setting signal from said input;
G. a time delay device in said branching line to cause a time-delayed signal; and
H. means for feeding said time-delayed signal to said passageway.

* * * * *